United States Patent [19]
Walker et al.

[11] 3,753,624
[45] Aug. 21, 1973

[54] BORING TOOL FOR SMALL DIAMETERS

[75] Inventors: Robert W. Walker, Detroit; Victor Milewski, Troy, both of Mich.

[73] Assignee: The Valeron Corporation, Detroit, Mich.

[22] Filed: Aug. 20, 1971

[21] Appl. No.: 165,818

[52] U.S. Cl.................. 408/159, 408/154, 408/180
[51] Int. Cl............................................ B23b 29/034
[58] Field of Search..................... 408/153, 154, 155, 408/158, 159, 168, 180

[56] References Cited
UNITED STATES PATENTS

| | | | |
|---|---|---|---|
| 3,296,898 | 1/1967 | Osborn | 408/159 X |
| 3,606,561 | 9/1971 | Davis | 408/159 X |

FOREIGN PATENTS OR APPLICATIONS

| | | | |
|---|---|---|---|
| 36,395 | 12/1922 | Norway | 408/153 |

*Primary Examiner*—Francis S. Husar
*Attorney*—Farley, Forster and Farley

[57] ABSTRACT

A boring tool having internal means for adjusting the cutting diameter comprising a housing pivotally supporting a tool shank therewithin and wedge means positioned within the shank to provide radial adjustment of the cutting point upon axial linear actuation of the wedge means.

16 Claims, 2 Drawing Figures

Patented Aug. 21, 1973

3,753,624

3,753,624

BORING TOOL FOR SMALL DIAMETERS

BACKGROUND OF THE INVENTION

A variety of prior boring tools include features which enable the cutting diameter of the tool to be changed either for feed out purposes or to compensate for wear. Some tools allow adjustment without stopping the tool. However, such prior tools are not particularly suitable for boring small holes.

Feed-out heads with cross-slides have been used, but they require a large supporting end to accommodate the cross-slide.

Cartridge-type tools, with cutter cartridges on the periphery of the tool nose, require an actuating member within the tool nose under the cartridges. These tools are accordingly limited as to the minimum diameter of the cutting portion of the tool and generally cannot be used to bore holes less than 1.5 inches in diameter or adjusted during use.

Tools which utilize eccentric movement of the cutting point have inherent imbalance and problems with alteration of the functional geometry of the cutting point which occur during adjustment. In tools which use linear actuation means in combination with eccentric movement, the linear stroke length does not produce equal increments of tool adjustment throughout the full range of adjustment thus complicating the adjustment procedure.

SUMMARY OF THE INVENTION

The present invention is directed to a small bore cutting tool including means facilitating automatic adjustment and accurate maintenance of the cutting diameter of the tool, and wherein the supporting end of the tool is relatively compact compared to prior adjustable boring tools.

The tool includes a housing having a boring bar assembly pivotally mounted at the outer end and a linear actuator located in the other end. Wedge means, preferably an integral part of the linear actuator, are received within a bore in the inner end of the bar assembly and reaction means provided for controlled wedge engagement therewithin are such that when the bar assembly is tilted in response to axial wedge movement the cutting point at the end of the boring bar will move radially to provide the desired diameter adjustment. By increasing or decreasing the axial penetration of wedge engagement, controlled adjustments for larger or lesser increments are readily obtained.

The working portion of the tool tilts rather than moving laterally or eccentrically, therefore the tool can be made radially smaller than other designs. The construction of the present tool provides improved precision adjustment and structural rigidity while maintaining a minimum overall diameter. The housing that receives the boring bar assembly need be no larger in diameter than the minimum accepted in normal practice and may even be smaller where the strength modulus of the housing material permits. Therefore, the tools may be closely stacked in a multiple tool operation when required. Easy retraction of the cutting point at the end of a cut to prevent scoring upon removal is another advantageous feature which is often critical in small hole boring operations.

DETAILED DESCRIPTION OF THE PREFERRED EMBODIMENT

Figure 1:
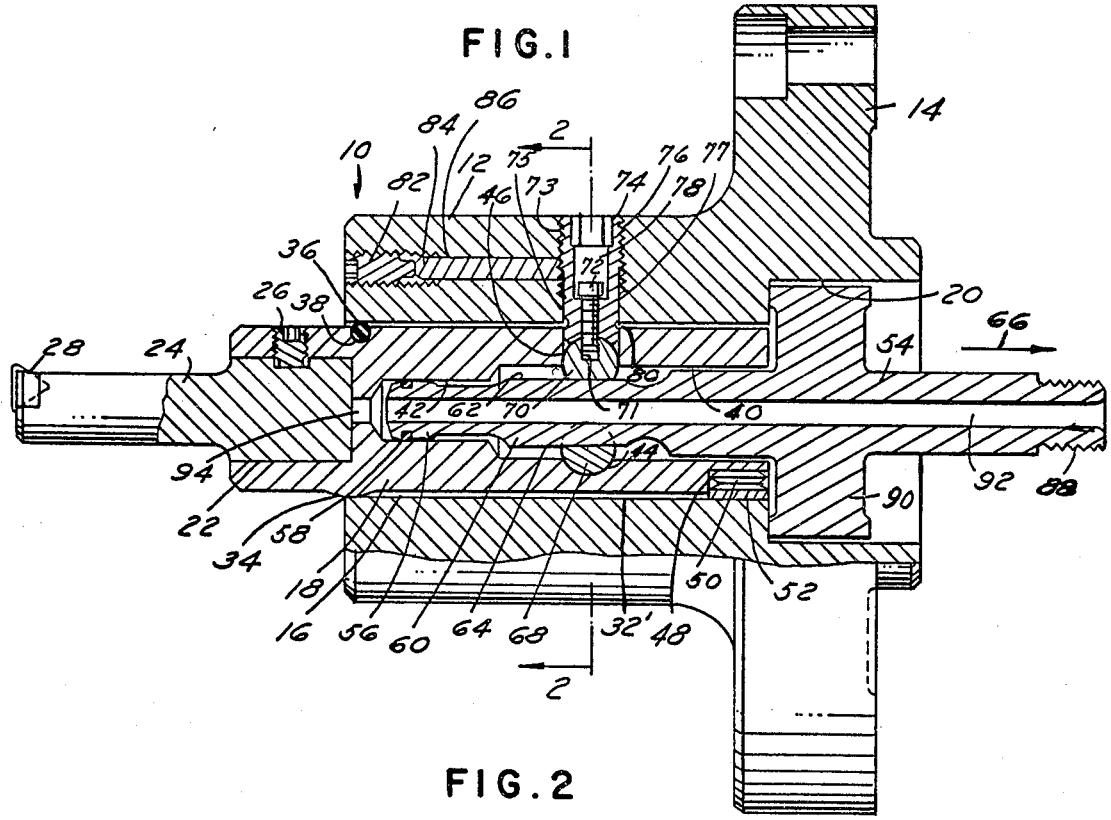
FIG. 1 is a longitudinal cross-sectional view of a boring tool according to the present invention.
Figure 2:
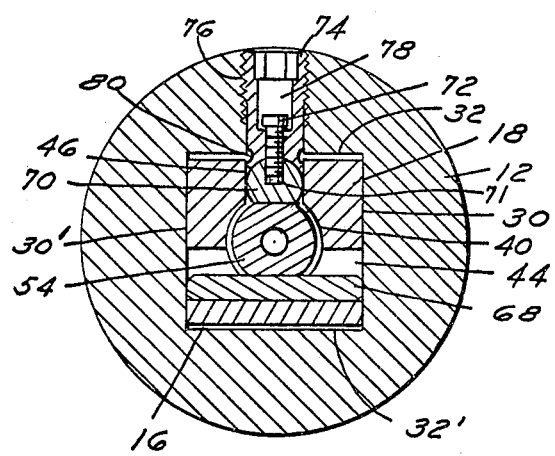
FIG. 2 is a cross-sectional view of the tool shown in FIG. 1 taken along the plane of line 2—2.

The boring tool 10 includes a housing 12 having an integral mounting flange 14 and a centrally disposed boring bar receiving cavity 16 extending longitudinally therethrough. The cavity 16 in this embodiment is polygonal in shape, preferably rectangular as shown, to receive a similarly shaped shank adapter 18 of a boring bar assembly. The flanged end 14 of the housing 12 has a central recess 20 having a lateral dimension greater than that of the cavity 16. The recess 20 serves as a stop as discussed below.

The boring bar assembly consists of a shank adapter 18 formed with a longitudinal opening 22 at one end to receive an interchangeable boring bar nose section 24 which is secured to the adapter by conventional means such as set screw 26. In other embodiments the adapter shank and nose section may be formed as a single piece. A cutting insert 28 is secured in a recess at the outer end of the nose section 24, also by conventional means.

The shank adapter 18 is constructed to conform to the shape of the cavity 16 and is dimensioned to provide a close sliding fit at the opposing lateral side walls 30 and 30' of the cavity 16 and a clearance fit at the upper and lower walls 32 and 32' of the cavity. The dimensioning allows limited movement of the adapter 18 in a vertical plane but not in a horizontal plane. A raised pivot land 34 extends laterally across the lower wall of the shank adapter 18 at a position where it will engage the lower wall 32' of the cavity at or near its outer end. Opposite the pivot land an elastic seal 36, of a material such as nylon, is positioned in a lateral groove 38 located in the upper wall of the shank adapter 18 and engaging the upper cavity wall 32. The seal 36 serves to tension the pivot land 34 against the lower wall 32' of the cavity 16 and to keep foreign matter out of this cavity.

The inward end of the shank adapter 18 is formed with a centrally disposed longitudinal aperture or center bore 40 terminating in a concentric pilot bore 42 of reduced diameter. A cylindrical opening 44 extends laterally through the inward end of the shank adapter, between side walls 30 and 30', at a point below the adapter center line and on the opposite side of the center line from the point of the cutting insert 28. The opening 44 is also positioned to intersect the bore 40. A radially disposed hole 46 extends through the upper wall of the inward end of the shank adapter at a point opposite the mid-point of the opening 44 and directly behind the cutting point. The hole 46 also intersects the bore 40.

A recess 48 is drilled radially into the shank adapter close to its inward end, also on the opposite side of the center line from the cutting point. Resilient means such as a Bellville washer stack 50 is placed in the recess 48 and bears against the lower wall 32' of the cavity 16 to preload the shank adapter. A metal disc 52 is placed between the washer stack and the cavity wall to prevent washers which are flattened in compression from sliding into the clearance space between the cavity wall and the shank adapter.

An actuator rod 54 is inserted in the bore 40 and includes a pilot end portion 56 which extends into the pilot bore 42 of the shank adapter. The pilot portion 56 is shaped with sufficient clearance to allow limited pivotal movement of the shank adapter 18. A seal ring 58 surrounds the pilot portion near the end of the rod.

Immediately behind the pilot portion 56 of the rod 54 is a wedge portion 60 having an upper flat surface 62 disposed parallel to the longitudinal axis of the rod and a lower flat ramp surface 64 disposed at an angle to the longitudinal center line. The ramp surface 64 is preferably inclined to reduce wedge thickness toward the rear of the tool as shown to provide actuation of the cutting point radially outward by axial movement of the actuator rod in the direction of the arrow 66. The angular inclination of the ramp surface 64 determines the extent of radial displacement for each increment of axial movement. The angle is preferably very small such as 1-½°.

The wedge portion of the actuator rod is slideably positioned between the cylindrical opening 44 and the hole 46 in the shank adapter. A half-rod 68 extends through the lower portion of the opening 44 and its flatted portion engages the ramp surface 64 of the rod. A flatted ball 70 is positiond in the hole 46 and engages the upper flat surface 62 of the rod. The flatted ball 70 is held in position by a screw 72 threaded into a hole 71 formed in the ball at a point on the curved surface directly opposite the mid-point of its flat.

The screw 72 is retained in an adjustment screw 74 threaded into a radially disposed hole 76 in the housing 12. The screw 72 passes through an unthreaded longitudinal opening in the adjustment screw 74 with its head located in a recess 78.

The hole 76 is positioned in alignment with the hole 46 and includes an upper threaded portion 73 and a lower cylindrical locating portion 75. The locating portion 75 is dimensioned to provide a close sliding fit with a cylindrical center portion 77 of the screw 74. The inner end of the adjustment screw 74 is dimensioned to fit into the hole 46 with a close sliding fit to positively fix the axial position of the shank adapter 18 in the housing 12. The inner end is formed with a circumferential groove 80 to allow the shank adapter to pivot in the housing.

The alignment guide or adjustment screw assembly is screwed downward into the aligned holes 76 and 46 until the flatted portion of the ball 70 is in complete contact with the upper flat surface 62 of the actuator rod. The adjustment screw assembly is screwed down further to move the actuator rod against the flatted portion of the half rod 68 until the flatted portion of the half-rod 68 makes complete contact with the ramp surface 64. The adjustment screw is screwed down somewhat further to preload the springs 50 and to set the minimum effective radius of the cutter as for retraction purposes, preferably with the flat 62 extending parallel to the tool axis. The adjusting screw may then be locked in by means such as a set screw 82 and brass rod 84 positioned in the housing in a longitudinal opening 86 which intersects the hole 76.

It is clear from the drawings that by moving the rod 54 to the right in the direction of the arrow 66 the adapter shank 18 will be pivoted about the land 34 which in turn moves the cutting edge radially outward to increase the cutting diameter. When the rod is moved axially in the opposite direction the wedging pressure is relieved and the resilient spring washers 50 cause the bar to return toward the central position.

The construction of the wedge portion 60 of the rod 54 with the upper flat surface parallel to the longitudinal axis and the containment of the wedge portion 60 by the half rod 68 and the flatted ball 70 assures that the rod 54 is maintained parallel to and concentric with the longitudinal axis of the tool housing 12 and the machine spindle to which it is attached thereby providing a balanced condition for any position of adjustment. The preferred embodiment of the invention assures that the balance built into the tool will be retained throughout the adjustment range since the flatted ball 70 and flat surface 62 are preferably adjusted to align the axis of the rod 54 with the housing axis when the boring tool is installed.

The actuating rod 54 includes a threaded end 88 which is adapted to be connected to a spindle push rod or other operating means (not shown) and has a stop collar 90 positioned to travel within the recess 20 and limit axial movement of the rod to the left. An optional feature is the central longitudinal coolant channel 92 which extends through the rod 54 and communicates with an opening 94 in the adapter shank which in turn connects the pilot bore 42 and the bar receiving opening 22. When coolant use is desired the bar nose section 24 is replaced with one having a conventional coolant channel.

Unlike other retractable or adjustable boring tools, none of the operating mechanism is required to be in the cutting end of the tool or under the cutting point, consequently much smaller bore holes can be made using the present invention. At the same time, the tool is relatively small at its supported end. No cross-slides or other relatively massive operating mechanisms are required, only a simple push-pull linear actuator to tilt the bar about the pivot land as shown and described.

We claim:

1. A cutting tool comprising;
    a housing,
    a boring bar pivotally mounted in the housing including a cutting point projecting therefrom, said bar and housing having interacting guide surfaces extending normal to the pivotal axis,
    longitudinally movable wedge means positioned within and acting between portions of the boring bar and housing longitudinally spaced from said pivotal mounting to provide lateral displacement of the cutting point upon longitudinal movement of the wedge means.

2. The cutting tool of claim 1, the bar having a portion of polygonal cross section within said housing.

3. The cutting tool of claim 2, wherein the polygonal cross section is rectangular.

4. A rotary cutting tool in accordance with claim 1 wherein the wedge means includes a rod adapted for actuation by a spindle push rod and having a planar surface inclined to the housing axis disposed to actuate adjustment of the bar.

5. The cutting tool of claim 1 including resilient means acting between portions of said housing and said bar longitudinally spaced from both said pivotal mounting and first named portions.

6. A cutting tool comprising,
    a housing, a boring bar pivotally mounted at one end of the housing including a cutting point projecting therefrom said bar and housing having interacting guide surfaces extending normal to the pivotal axis, longitudinally movable wedge means positioned within and acting between portions of the bar and housing longitudinally spaced from said pivotal mounting and adapted to displace laterally the cutting point upon longitudinal movement of the wedge means, and resilient means acting between portions of said housing and said bar longitudinally spaced from said pivotal mounting and said first named portions for preloading the bar against said wedge means and said pivotal mounting.

7. The cutting tool of claim 6 wherein said housing and bar include central apertures extending longitudinally therewithin and the wedge means is located within the bar aperture.

8. A rotary cutting tool as set forth in claim 7 wherein the wedge means includes a planar surface inclined with respect to the housing axis and adapted for actuation by a spindle push rod.

9. The cutting tool of claim 8 wherein the bar is provided with a flatted roller extending through the aperture and engaging the inclined surface.

10. The cutting tool of claim 8 wherein an extension of the wedge means engages the bar in the aperture at a second location axially spaced from the inclined planar surface.

11. The cutting tool of claim 10 wherein said first named housing portion includes adjustable reaction means engaging the wedge means.

12. The cutting tool of claim 6 wherein the bar includes a polygonal cross sectional portion within the housing having planar surfaces perpendicular to the pivot axis engaging the housing with a close sliding fit.

13. The cutting tool of claim 12 wherein the polygonal portion is rectangular with sufficient clearance for pivotal movement adjacent the sides parallel to the pivot axis.

14. The cutting tool of claim 8 wherein the resilient means include spring means and the inclined surface is located longitudinally between the pivot and the spring means.

15. A rotary cutting tool comprising, a housing, a boring bar pivotally mounted in the housing and having a cutting point provided at one end, an aperture extending axially within the bar, an axially actuatable rod extending within the aperture and slidably engaging the bar therewithin, a planar wedging surface on the rod inclined to the axis of the housing and axially spaced from the engagement of the rod and bar and the pivotal mounting, a reaction surface in the bar engaging the inclined surface for pivotal movement of the bar upon actuation of the rod, reaction means engaging the rod opposite said wedging surface and retained in the housing, resilient means acting between said housing and bar axially spaced from the pivotal mounting and the wedging surface for preloading the bar against said pivotal mounting and reaction means, and a rectangular cross section on at least a portion of the bar within the housing having a close sliding fit on the sides perpendicular to the pivot axis and sufficient clearance for pivotal movement adjacent the sides parallel to the pivot axis.

16. The cutting tool of claim 15 wherein the resilient means include spring means and the inclined surface is located axially between the pivot and the spring means.

* * * * *